United States Patent [19]

Schreiber et al.

[11] 4,151,564
[45] Apr. 24, 1979

[54] MODULAR, SEMIAUTOMATIC CREDIT CARD READER/WRITER APPARATUS

[75] Inventors: James N. Schreiber, Livonia; Donald L. Bumgardner, South Lyon, both of Mich.

[73] Assignee: Burroughs Corporation, Detroit, Mich.

[21] Appl. No.: 857,032

[22] Filed: Dec. 2, 1977

[51] Int. Cl.² .................... G11B 25/04; G06K 7/08; G11B 5/09; G11B 21/10
[52] U.S. Cl. ........................ 360/2; 235/449; 235/466; 360/52; 360/77; 360/101; 360/105; 360/109
[58] Field of Search ............... 360/2, 51, 52, 75, 77, 360/88, 101, 105, 109; 235/449, 450

[56] References Cited

U.S. PATENT DOCUMENTS

| | | | |
|---|---|---|---|
| 3,822,376 | 7/1974 | Kok et al. | 360/2 |
| 3,914,789 | 10/1975 | Coker, Jr. et al. | 360/2 |
| 3,953,887 | 4/1976 | Kobylarz et al. | 360/2 |
| 4,087,680 | 5/1978 | Mack et al. | 235/449 |

*Primary Examiner*—Daryl W. Cook
*Attorney, Agent, or Firm*—Carl Fissell, Jr.; Kevin R. Peterson

[57] ABSTRACT

A reader/writer credit card modular assembly wherein a T-shaped vertically disposed rail member provides accurate positioning of a credit card relative to a read/write transducer and to a timing track transducer through a reference plane established by means of horizontally disposed pins carried by the rail member. The credit card is vertically supported on the pins which in conjunction with a built-in tool or gauge member adjustable parallel to the card enables accurate preadjustment for a plurality of electromagnetic transducer heads arranged to be moved across the front surface of the credit card effective thereby to read from or write upon the credit card in synchronism with a prerecorded timing track disposed adjacent and parallel to the credit card.

12 Claims, 10 Drawing Figures

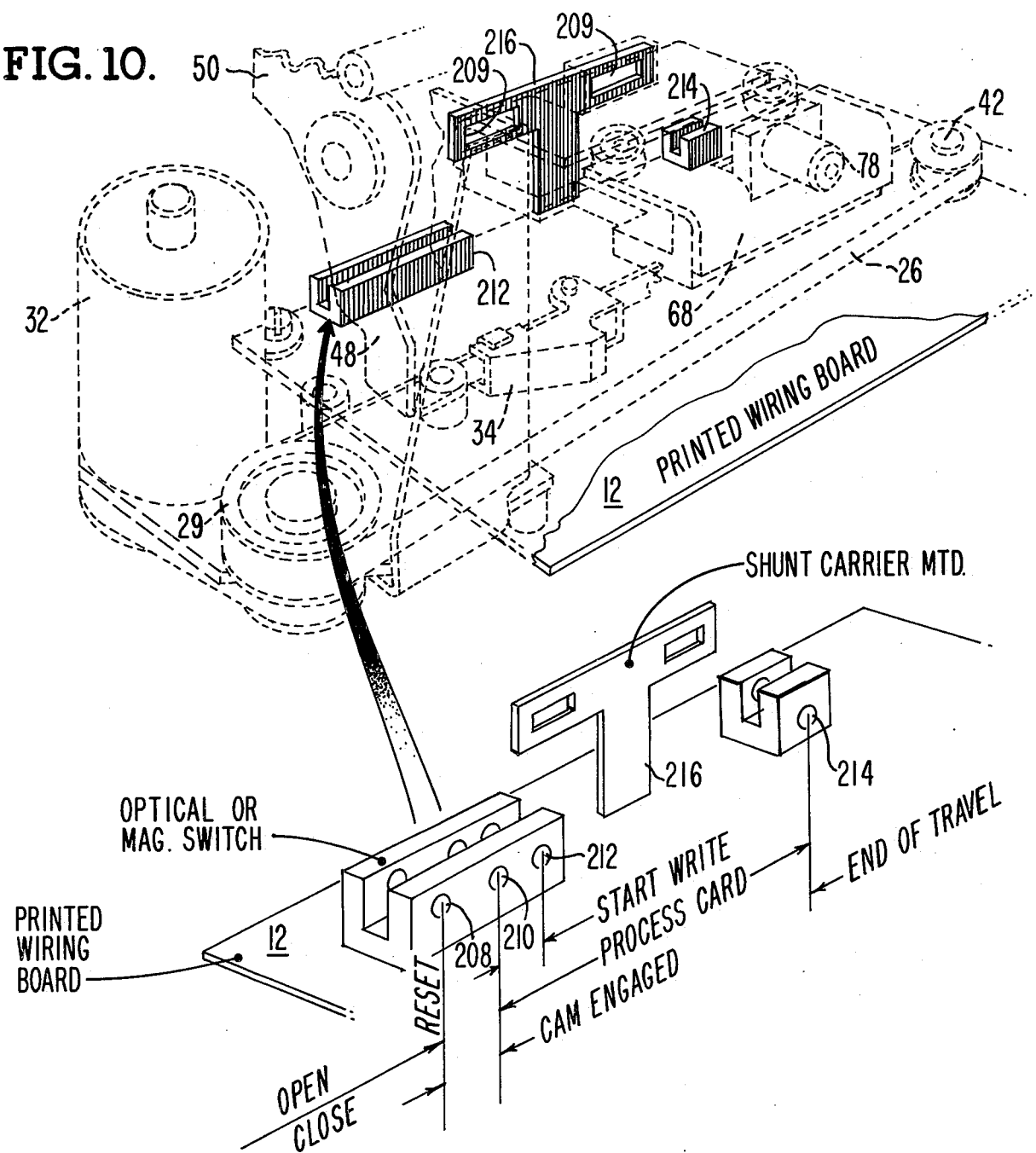

MODULAR, SEMIAUTOMATIC CREDIT CARD READER/WRITER APPARATUS

BACKGROUND OF THE INVENTION

1. Field of the Invention

The present invention relates to credit card reader/writer apparatus and more particularly to reader/writer credit card apparatus wherein the relative positioning of the credit card and transducer mechanism can be preadjusted for accuracy and preset so that removal, dismounting and/or replacement of the transducer mechanisms will not materially disturb the head-to-card geometry.

2. Description of the Prior Art

Prior art devices generally perform reasonably well so long as the read/write head-to-card pressure is maintained fairly precise. Problems arise when wear sets in and transducer head or heads must be changed or renewed. Precise readjustment is often not accurate and as the pressure between the card and the head decreases, the signal level eventually falls below an acceptable minimum level and eventually to a point where the information pick up deteriorates or becomes spotty and inaccurate. Precise adjustment generally requires precision tools or else the results are negative or unpredictable.

Additionally, set up time can be disproportionate to the utilization time of the device making the head-to-card adjustment overly costly and in some cases prohibitive.

Additionally, the timing devices used with the prior art card reader/writer apparatus are often difficult to maintain in terms of accurate synchronization.

SUMMARY OF THE INVENTION

It is an important object therefor of the present invention to provide semiautomatic credit card reader/writer apparatus which maintains a precise head-to-card adjustment once the adjustment has been fixed regardless of whether the head is moved relative to the card or not.

Another important object of the invention is to maintain the preadjusted head-to-card pressure precise throughout the range of movement of the head relative to the card.

Still another object of the invention is to provide a demountable timing track which can be prerecorded to suit the individual requirements of any card or group of credit cards.

Still another object of the invention is to provide a credit card reader/writer apparatus wherein operator intervention is completely unnecessary and wherein the only requirement of the operator is to insert the credit card into the apparatus whereupon the apparatus operates in a semiautomatic mode both reading and/or writing and finally releasing the card for retrieval by the operator.

Still another object of the invention is to prevent retrieval of the card except at the time provided in the normal operating cycle.

These and other objects and advantages of the present invention are achieved by a modular semiautomatic credit card reader/writer apparatus wherein a T-shaped member supports a rectilinearly movable transducer carriage and wherein horizontally disposed pin members vertically support a magnetic credit card so that oppositely disposed transducer members are movable across the card and timing track by means of a motor driven tape and wherein the card is cam locked in place against accidental dislodgement and further including gauge means adjacent to said credit card and to said transducers for preadjusting the card-to-head spacing effective to maintain the adjustment regardless of the movement of the transducer across the card or the removal of the transducer from the apparatus and the reinsertion of a different transducer therein.

Other objects, features and advantages of the present invention will be readily apparent in the following detailed description when considered in light of the accompanying drawings, which illustrate by way of example, and not limitation, the principals of the invention and preferred modes for applying these principals.

BRIEF DESCRIPTION OF THE DRAWINGS

FIG. 7 is a detail view of the transducer mounting carriage;

FIG. 10 is an isometric exploded detail view of the head carrier positioning and indicating apparatus of FIG. 1.

DETAILED DESCRIPTION OF THE PREFERRED EMBODIMENT SUPPORT RAIL, HEAD CARRIER AND MOTOR

Figure 1:
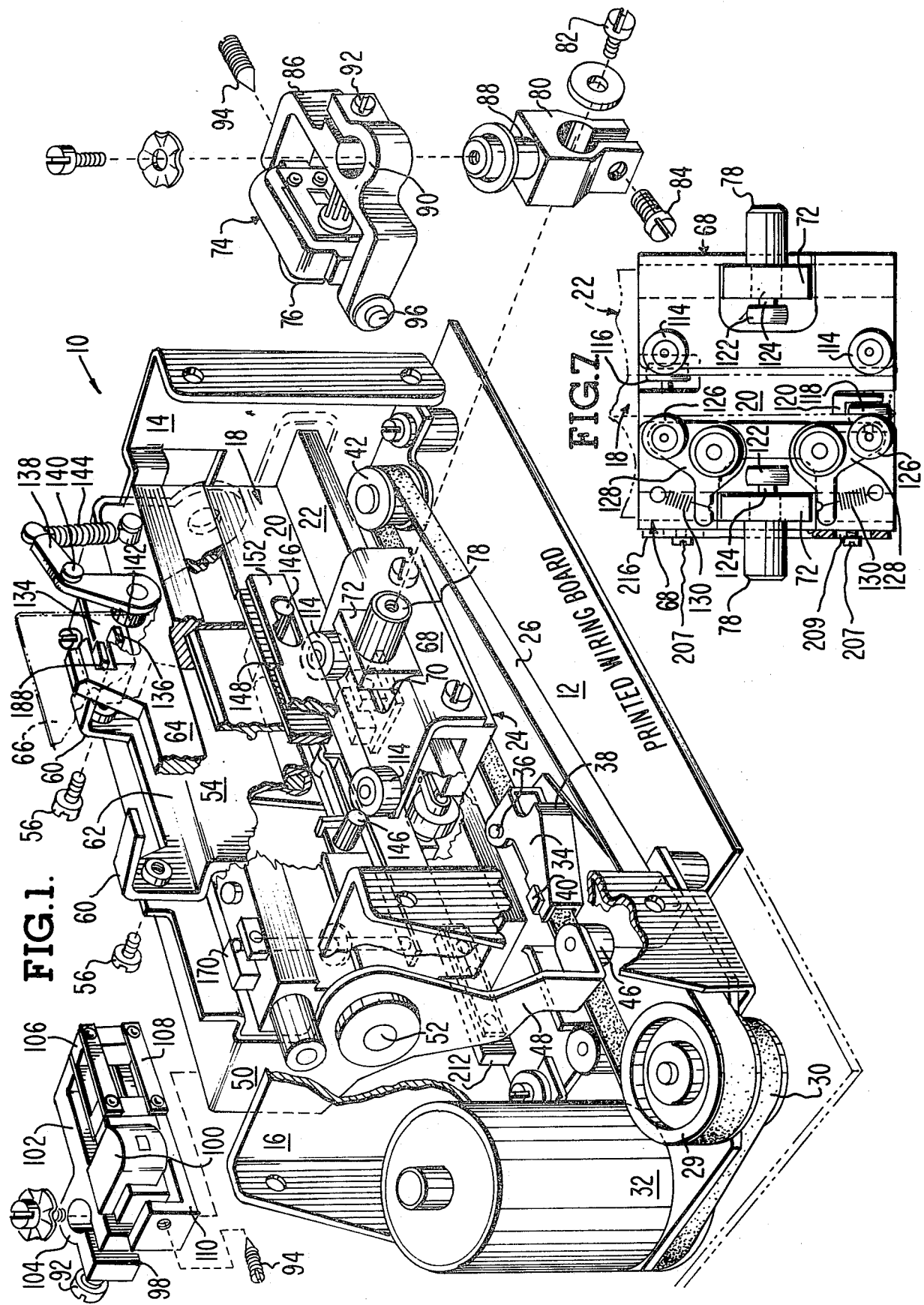
FIG. 1 is an isometric view of a preferred embodiment of the present invention.

Referring to the isometric view of FIG. 1, there is shown read/write apparatus 10 embodying the present invention. A flat, short-like printing circuit board 12 extends between oppositely disposed vertically oriented end wall members 14 and 16. A T-shaped member 18 of rigid material such as steel including a vertical portion 20 and an integral horizontal portion or cross bar 22 forms a main structural support for the present invention. The "T" is inverted so that the cross bar of the "T" is at the bottom, disposed horizontally and parallel to the surface of member 12, and is supported between the two upright end wall members 14 and 16, as shown. A rigid U-shaped transducer carriage member 24 is mounted for rectilinear movement, right to left and return, along the flat cross bar portion 22 of the T-shaped member 18 by means of a tape or belt drive including tape member 26, compound pulley 28, belt 30 and reversible drive motor 32, the latter being rigidly mounted on suitable support structure in a convention manner.

Credit Card Gate Drive

Figure 5:
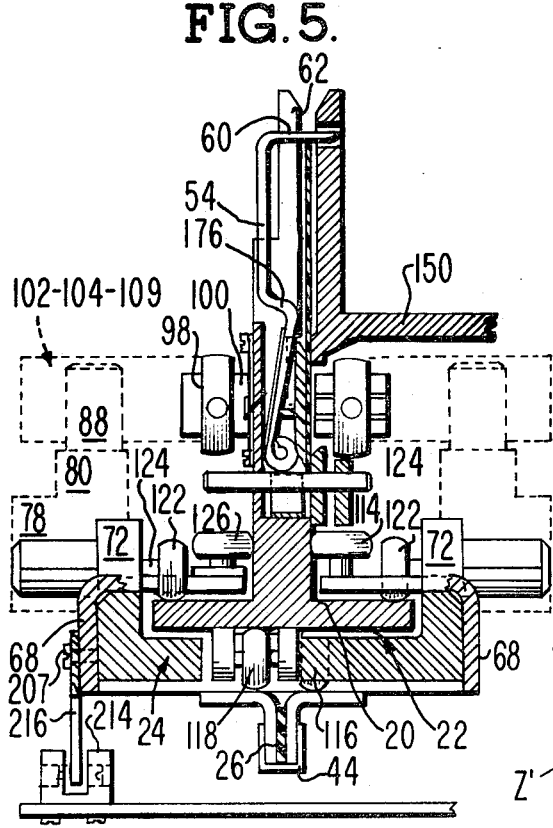
FIG. 5 is an end elevational view in section illustrating the transducer support carriage mechanism.

An irregularly shaped cam member 34 carrying a roller support 36 and provided with a truncated protuberance 38 includes means 40 for attaching opposite ends of tape member 26 thereto. Tape 26 is arranged to travel over drive pulley 28 at the motor end of the base structure while the opposite end of the tape is carried over idler pulley 42. As seen in FIG. 5, member 24 is secured to tape 26 by means of a clamp member 44 effective to prevent accidental loss of dislodgement of the tape and also to permit take-up of tape slack should this occur as well as to enable repositioning of the carrier should this be necessary or desirable.

Figure 6:
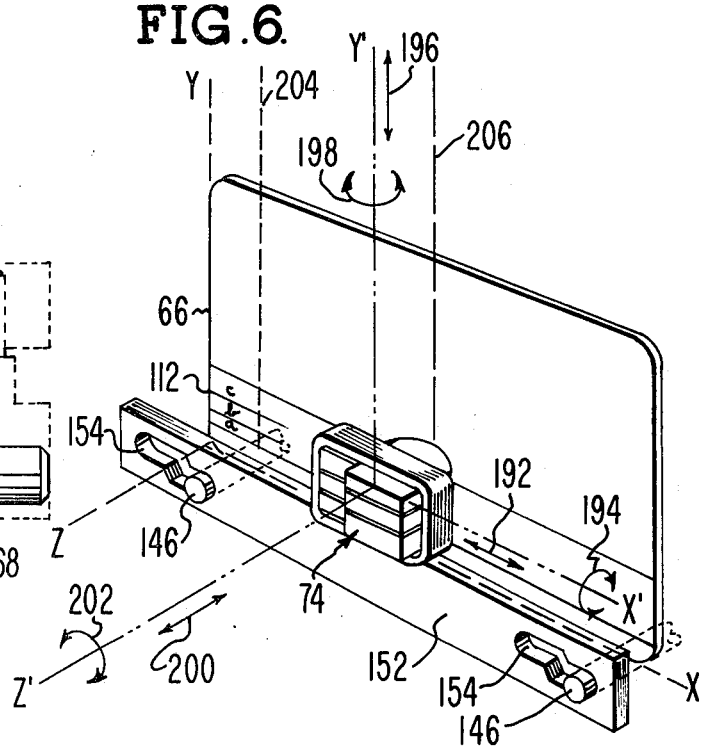
FIG. 6 is a schematic isometric view illustrating the various head mounting and adjusting coordinates.

Cam 34, FIG. 1, operates in conjunction with a follower roller 46 carried on the horizontal extending tang of depending link 48. Link 48 is formed from the depending end of a rockable member 50 pivoted to cross bar 52 and carrying a plate member 54 secured to the upturned rim thereof by means of bolts 56. The upper portion of plate 54 is undercut as at 58 providing two oppositely disposed finger-like tangs 60 bent forwardly, FIG. 1, and adapted in one position of movement to overlie a magnetic credit card receiving throat 62 formed between an undercut front wall forming member 64 and plate 54. A magnetic credit card 66, shown in dotted outline, FIG. 1, and in full in FIG. 6, is insertable in throat 62, and engageably the tangs 60 for purposes which will appear more fully hereinafter.

Head Mounting For Credit Card Head

Secured as by bolts and overlying opposite sides of carriage 24 are individual L-shaped members 68, FIG. 5. The central portion of each L-shaped member 68 is provided with a substantially rectangular cutout 70, FIG. 1, through which a vertical upstanding rectangular post 72 integral with carriage 24 projects, as seen in FIGS. 1 and 5. An electromagnetic transducer 74 including multiple track data handling heads 76, for purposes to be explained presently, is operably coupled to member 72, as will now be described. Transducer 74 includes three heads, each individually sprung as will appear more fully hereinafter.

Tracks I and II may read only or be now operational. Track III may read only or may read and write.

Extending horizontally away from vertical post 72 is a hub member 78 providing attachment means for a rotatably, adjustable pivot-yoke-member 80 secured thereto as by bolt 82. Orienting and tightening adjustment of yoke 80 is provided by bolt 84. U-shaped gimbal mounting member 86 is pivotally secured on vertical stud 88 projecting away from member 80 and secured thereto by means of integral yoke 90 fastened by bolt 92. Disposed between the confronting parallel arms of gimbal member 86 is multiple track read/write head member 76 having three active heads or gaps, as shown in FIGS. 2 through 6, inclusive. Member 76 is secured to gimbal 86 by means of an adjustable mounting pivot 94 and fixed pivot 96.

Head Mounting For Position Transducer Head

The opposite L-shaped member 68, as seen in FIG. 5, has mounted thereto a transducer 98 (FIG. 1) carrying a read head 100 provided with a single channel, as shown. A pivot mount 80, FIG. 5, with its associated yoke is secured to the horizontal post 78 of vertical member 72. A gimbal suspension arm 102 upper left, FIG. 1, also provided with a yoke 104, includes an L-shaped extension 106. A plurality of flexible suspension members 108 are secured to the terminal end of member 106 and carry a U-shaped gimbal mount 110 at the end thereof. Read head 100 is pivotally disposed between the ends of the U-shaped mount 110 to present a single active gap, as seen in FIG. 1, to the magnetic stripe 189 forming the slidably demountable timing track for the present invention.

Head To Card Alignment Required

In order to read information-data from the magnetic stripe 112 on magnetic credit card 66 (stripe 112 is divided into three separate segments or tracks 112A, B and C), the transducer carrier or carriage 24 is movable approximately from one side of the apparatus to the opposite side carrying with it the two transducers 74 and 98. As seen in FIGS. 1, 5 and 7, carriage 24 is supported in both the vertical as well as the horizontal plane by means of rollers which are adapted to ride along the flat, horizontal extension 22 of T-shaped member 18 as well as oppositely disposed pairs of rollers which are adapted to ride against the opposite faces of the vertical wall 20 of member 18, as will now be described. In addition, rollers are provided to suspend the carriage in its travel back and forth along the member 22.

Carrier Support

Rollers 114—114, FIGS. 1, 5 and 7, are fixedly secured for rotation in a vertical position at opposite ends of right side plate 68 and are adapted to roll in surface contact with the lower facing wall portion 20 of the vertical section of T-member 18. Roller 116, FIG. 7, is secured beneath the rear portion of right hand member 68 for rotation, horizontally along the lower surface of member 22. Roller 118 is rotatably secured to the front portion of right hand member 68 by means of a flexible mounting member 120, FIG. 7, for rolling surface contact with the lower surface of member 22. Suspension rollers 122—122 are disposed in horizontal attitude for rotation about inboard stud member 124 secured to the vertical posts 72. These rollers support the carriage along the opposite rail surfaces 22—22. Located on opposite ends of left hand member 68 are mounted two spring biased rollers 126-126 rotatable on respective arcuately pivotal links 128, each one of which is spring biased into engagement with the side wall 20 of 18 by means of a spring 130.

Motor and Belt Drive of Carrier

Energization of reversible electric motor 32 from a source of electrical potential (not shown) will cause the drive belt 30 to rotate compound pulley 28 to drive tape 26 attached to carriage 24 effective to move transducers 74 and 98 leftwardly or rightwardly depending on the desired signal input from the data processing apparatus (not shown) to which the present read/writing apparatus is adapted to be interconnected. Carriage 24 rests with switch actuator 216 operating photoswitch home 208. During leftward motion photoswitches 210, 212 and 214 are operated in sequence by switch actuator 216 and rightward motion produces the reverse sequence.

The magnetic credit card read/write apparatus of the present invention incorporates a number of new, novel and heretofore unobvious features over the prior art as will now be described.

Card Handling Orientation Required

Because it is possible (though not advisable nor desirable) to insert the magnetic stripe bearing card 66 vertically into the card receiving throat rather than horizontally as intended, a mechanism is provided to prevent the apparatus from cycling when the card is in this inappropriate position. Also, since the horizontal insertion condition is considered normal and required, means is provided for signaling this correct condition to the start-stop controlling apparatus. Additionally, it is desirable that the apparatus not cycle unless or until the information-data bearing card is correctly seated, i.e. received in the throat and bottomed therewithin so as to present the magnetic stripe 112 exactly horizontally to the active gap or gaps of the read/write transducers 74 and 98. Any positioning other than this precise alignment results in a low level signal output and perhaps even a garbled signal pick up.

Horizontal Positioning of Card and Check

Figure 9:
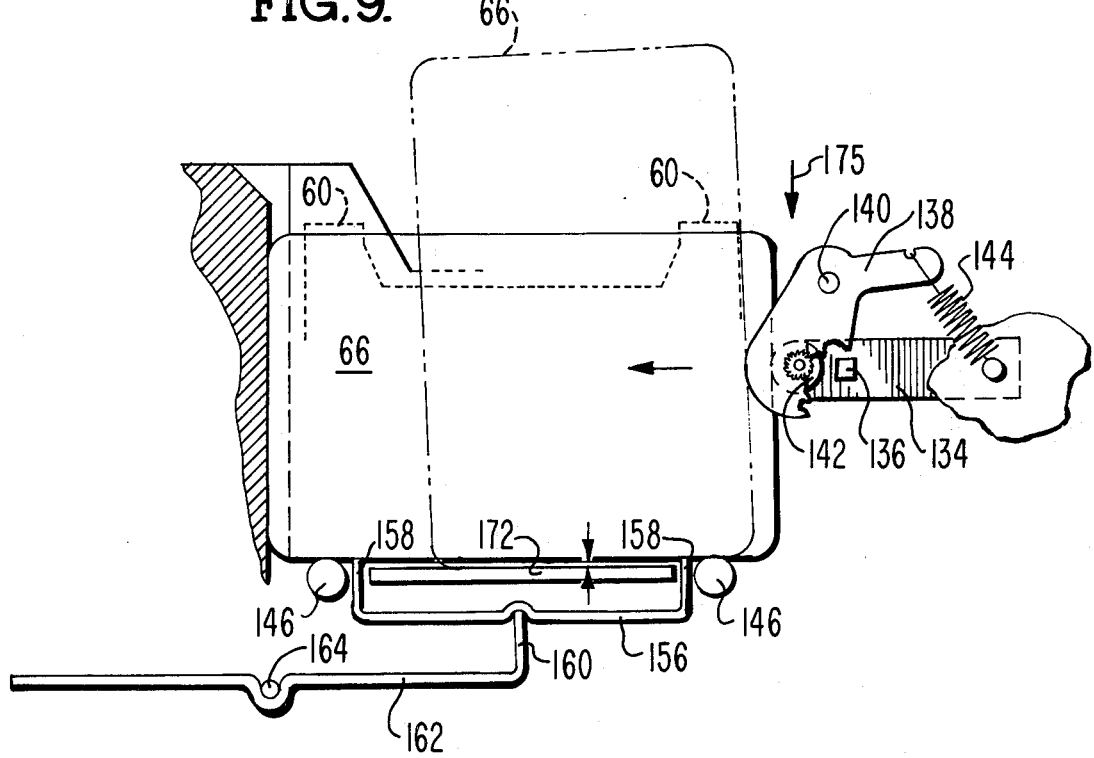
FIG. 9 is an enlarged front elevational view of the card cam switch.

Located in the upper right hand quadrant of the read/write apparatus 10, as seen in FIG. 1, and, as shown in detail in FIG. 9, is a mircoswitch 134 with its plunger 136 disposed so as to extend forwardly into the area adjacent to the card receiving throat 62. A rockable link 138 pivoted at 140 on front wall 64 carries a cam follower 142. Link 138 is normally spring biased rightwardly by spring 144 in the position shown in FIG. 1, but with the card 66 shown therein in phantom completely within the card throat 62, link 138 is rocked leftwardly against spring tension permitting the switch actuator-plunger 136 to move forwardly closing the switch and producing a signal indication that the card is in position, at the time of card gate closure. (Note that the downward movement of the card horizontally oriented causes the side edge of the card to deflect the cam follower moving the link out of the way of the switch actuator effectively closing the switch.) Conversely, should the card be inserted vertically as illustrated in dotted outline in FIG. 9, then link 138 remains in the biased position shown and switch 134 is not closed at card gate closure time indicating that the card either is not in place or is improperly positioned.

Vertical Positioning of Card and Check

Figure 8:
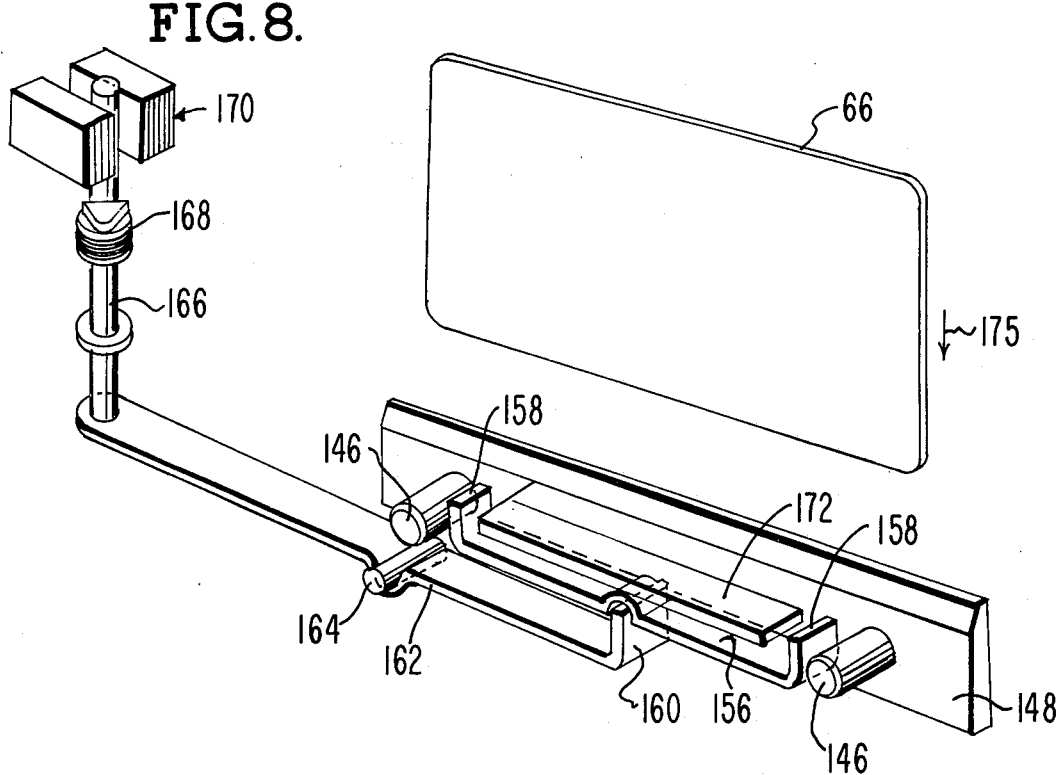
FIG. 8 is an enlarged isometric view of the card in place switch.

In order to assure the accurate alignment of the magnetic tracks on the magnetic stripe of the credit card with the head gap of the read/record heads, a pair of oppositely disposed horizontally extending pins 146 projecting outwardly away from a rail member 148 extending across the open area or gap 150, FIGS. 2, 3, 4 and 5, in front wall member 64 provide a reference plane against which the card and likewise the heads can be aligned. The card, as seen in FIGS. 8 and 9, is supported on these pins. Adjacent to and forwardly of pins 146 and rail 148 is located a movable head positioning bar or aligning tool 152, FIGS. 1 and 6 (particularly FIG. 6), provided with oppositely disposed slots 154 within which the bar or tool 152 is slidable. Leftward movement of bar 152 will raise the head structure while rightward movement of the bar will lower the head structure. Once the head is moved into position, the positioning bar is lowered to its rest or stored position until needed again for realignment.

Operational means is provided to automatically indicate to the operator and to the associated machine hardware that the credit card is correctly inserted or entered into the throat 62 and that the card is properly and accurately oriented therewithin with respect to the read/record heads.

As seen most clearly in FIGS. 8 and 9 (and in dotted outline in FIG. 1), a rockable, horizontally disposed link 156 extending between pins 146—146 as shown and provided with opposite upturned ends 158 is mounted for seesaw rocking movement about the upturned end 160 of horizontally extending member 162, the latter being rockably pivoted about short pin 164.

A vertically arranged switch actuator member 166 biased downwardly by spring 168 extends upwardly, FIG. 8, between the confronting faces of the operational elements of a solid state photoelectric switch 170. A flat, horizontal shelf-like member 172 is situated between pins 146—146 and extends in between the upturned ends 158 of member 156. As seen in FIG. 9, the upturned ends 158 extend vertically a slight distance above the periphery of pins 146—146. When a credit card 66 is properly introduced into throat 62 and is accurately bottomed against pins 146—146, the lower edge 174 of card 66 will engage the upturned ends 158 of the horizontally disposed link 156. Downward pressure in the direction of arrow 175 will cause the link 156 to be lowered pressing down on the upturned end 160 of member 162 causing the leftward end of member 162 to move in an upward direction pushing switch actuator 166 upwardly between the elements of solid state photoelectric switch 170 interrupting the light beam of the switch and closing the switch indicating that the card is in its proper position for the read or write operation to proceed.

Conversely, if the card should be introduced into the throat 62 in the manner shown in the dotted outline of FIG. 9, the horizontally extending ledge or shelf-like member 172 will support one edge portion of the card while the opposite edge portion will be supported on the pin and will contact the rightward upturned end of the horizontal link 156. Since downward pressure on both ends of the link is required to depress the member 162 to actuate the switch, no switch actuation will be accomplished and thus the machine cannot cycle since a suitable output signal has not been received from the switch. The combination of the signal output from switch 70 and switch 134 is required to cause the machine to cycle by energization of the electric motor 32.

Figure 4:
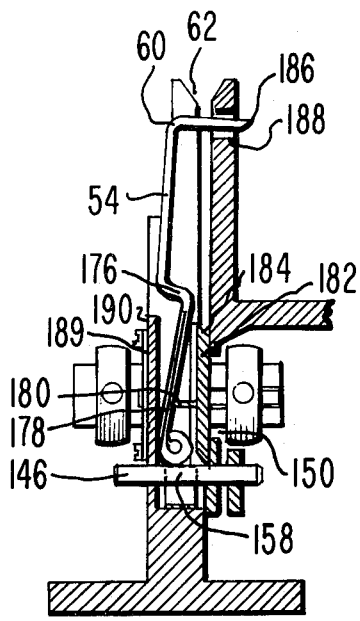

As earlier mentioned herein, the credit card 66 is adapted to be inserted into throat 62 horizontally and to bottom upon pins 146—146 and upturned ends 158 to close switch 170. The card insertion sequence is illustrated in FIGS. 2 through 5 inclusive with FIG. 4 illustrating the situation wherein the card throat is locked or closed so as to prevent or block introduction of a card as will be explained in more detail later on herein.

Figure 2:
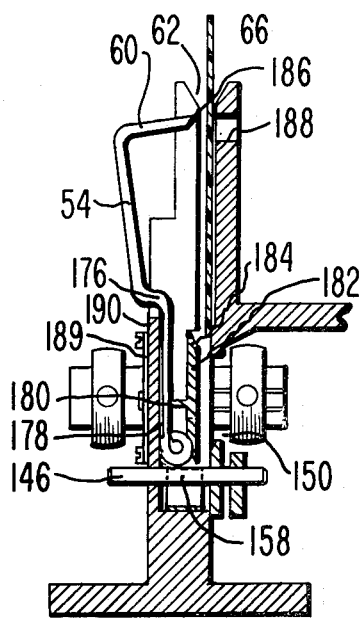
FIGS. 2, 3 and 4 are step views illustrating the card receiving throat in open (card free); closed (card present); and closed (card absent) condition, respectively.
Figure 3:
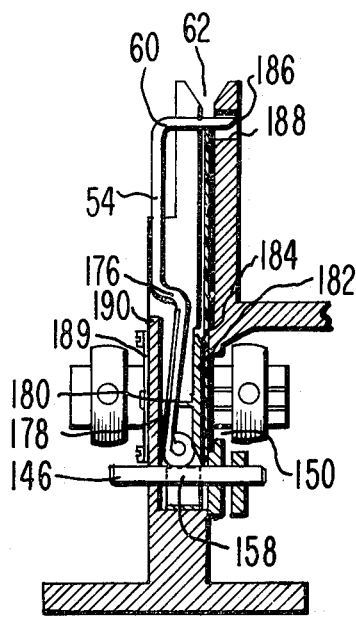

Referring first to FIG. 2, it is seen that member 54, FIG. 1, bearing the tangs 60 is irregularly shaped with a double bend 176 therein. A flexible flat spring member 178 is disposed at the rear (left in FIGS. 2 through 5 inclusive) of member 54 and extends upwardly vertically to terminate at a point just below the double bend 176. Spring 178 normally biases member 54 rightwardly causing tangs 60 to overlie throat 62. Secured to the lower portion of member 54 by means of a swivel connection 180 is a flat, elongated pressure plate 182, the upper edge portion of which is beveled slightly as at 184. Member 182 forms a flattening device for the magnetic stripe area of card 66 and tends to remove any undulation or distortion of the card caused by rough handling or undue bending, etc. Movement of cam 34 and the resultant rocking movement of members 48-50 moves member 54 so as to bring the upper portion carrying tangs 60 leftwardly opening throat 62 while the bottom portion of member 54 carrying pressure plate 182 is withdrawn leftwardly from the card engaging position to the inactive position shown in FIG. 2.

As card 66 is inserted into the throat 62, it slides passed bevel 184 so as to bottom on pins 146—146 and the ends 158—158. The card insertion is completed, as in FIG. 3, by the tangs 60 camming the chamfered edge 186 thereof over the top edge of the card so as to force the card down upon the pins 146 and causes the ends of the tange 60 to project into and through access openings 188 in wall member 64, FIGS. 1 through 5, inclusive.

It was earlier stated herein that a demountable timing track was provided as a feature of the present invention. This track is provided by a slidable, elongated member 189 bearing a magnetizable surface (not shown) for retaining the timing data used with the credit card information of the present invention. Member 189 is secured in a grooved track 190 on the left side of wall member 20 and is arranged to be demountable at will so that easy repair or replacement is provided.

The alignment of the transducer head gaps with respect to the medium, i.e. the plastic credit card 66, involves a number of degrees of freedom of movement certain of which are maintained fixed but adjustable and certain others of which are self-aligning due to the gimbal suspension system involved therewith. FIG. 6 of the drawings incorporates these various coordinates by way of a schematic illustration, as will now be described.

The X, Y and Z axes reflect the fixed magnetic medium coordinates. The X', Y' and Z' axes represent the movable head mounting coordinates. Transport displacement travel is in the direction of double headed arrow 192, while gimbal rotation self-alignment is represented by the circular arrow 194. The head-to-track vertical displacement adjustment is in the direction of double headed arrow 196 while the tangency rotation adjustment is represented by circular arrow 198. Head pressure displacement adjustment is in the direction of double headed arrow 200 while the skew rotation adjustment is represented by circular arrow 202. The flux reversal axis is along the dotted line 204. The read/write gap axis is along broken line 206. Head positioning or mounting bar 152 is illustrated in the active position with the head adjustment at rest thereon.

The read/record transducer head 74 is positioned to the two mounting pins 146 by means of the head positioning bar 152 which functions in accordance with the present invention as an auxiliary tool. Head restraints on the Y' and Z' axes are loosened and bar 152 is moved under the head with the card 66 removed. The head is adjusted to the head positioning bar along the Y' axis. This provides accurate vertical positioning along, and orientation about, the Y' axis. The Y' axis is then secured. The medium, i.e. plastic card 66, is inserted into the throat 62 and the head is adjusted to the positioning bar 152 and the media surface along the Z' axis. The head positioning bar 152 provides accurate positioning of skew rotation about the Z' axis. By sighting along the magnetic media, the head can be brought into contact with the magnetic media. When contact is made, the calibrated threaded adjustment 82 is used to advance the head a known displacement toward the media to obtain the desired head pressure from the calibrated head support springs 108. At this point the Z' axis adjustments are secured and head positioning bar is returned to its rest position.

Operational Description

Referring to FIG. 10 (also FIG. 1) with carriage 24 at the home 1 position, that is with carriage positioning and indicating device or switch actuator 216 operating photoswitch 210 magnetic credit card 66 is inserted into throat 62 operating photoswitch 170 energizing motor 32, FIG. 1. Switch actuator 216 comprises a T-shaped member, FIG. 10, and is secured to the outboard side of carriage 24 as shown in FIG. 7 and is attached thereto by means of bolts 207 through slots 209 in the actuator. Lateral position adjustments for the actuator 216 is thus provided. Carriage 24 starts in motion to the right.

From this point, no operator action is required with all functional control coming from the data processing apparatus to which the reader/writer is attached. This avoids operator error in the use of the reader/writer device and provides maximum security for all read/write transactions, greatly reducing the possibility of credit card fraud.

As carriage 24 moves to the right cam 34, FIG. 1, is moved to the right allowing follower 46 and thus rockable member 50 to rotate about pivot 52. Tangs 60 contact the card first. With an object in slot 62 which is too long tangs 60 will be prevented from moving and card gate closure will be prevented as shown in FIG. 9. With a normal credit card tangs 60 will proceed across the top of the card forcing it down onto pins 146 insuring accurate vertical positioning when card gate closure is completed under the action of flat spring 178. At the time of closure flat spring 178 (FIGS. 2–5 inclusive) exerts a force on credit card 66 through pressure flattening plate 182, FIG. 3. This force is resisted by card support members; front wall 64 and rail 148. As closure occurs, microswitch 134, FIG. 1, is positioned so that plunger 136 may be operated by cam follower 142. If the object in the card throat 62 has sufficient width and height to position cam follower 142, then microswitch 134 will operate indicating "card in place" and completion of the gate closure operation. Only an object similar in size and shape to a credit card will produce an output from switch by indicating "card in place" and card gate closed. If at the time photoswitch 210 is operated by switch actuator 216 and microswitch 134 has not operated, the carriage 24 is returned to the home position. If, however, upon reaching photoswitch 210, microswitch 134 has operated the carriage 24 continues on. At photoswitch 212 start sentinal writing starts if required. This signal accurately locates the start of the written message with respect to the edge of the card. The message to be recorded is provided by the associated data processing equipment (not shown). The physical location of the flux reversals on the card 66, however, are controlled by the output of transducer 98 as position information is read from timing track 189. Relative motion between transducers 98 and 74 is minimized by structural design as heretofore described. Upon completing a traverse of the card switch-actuator 216 operates photoswitch 214 returning the carriager 24 to a home position. If additonal card processing is required, operation of photoswitch 210 by switch actuator 216 stops carriage motion before the card gate is opened. If the transaction is complete, operation of photoswitch 208 by switch actuator 216 stops carriage. This occurs after card gate has been opened by cam 34 and card may be retrieved by the operator.

What is claimed is:

1. Magnetic credit card reader/writer apparatus comprising:
   an elongated rigid member disposed adjacent to a credit card receiving aperture or throat and provided with oppositely disposed card abutting means for registering at least an edge portion of said card, electromagnetic transducer means including means permitting said transducer freedom of motion in orthogonal planes relative to said credit card, means operably associated with said registering means and positionably adjustably movable relative to said registering means for establishing a fixed reference plane of movement for said transducer adjacent to said credit card, means to immobilize said transducer in at least one of the planes of movement relative to said credit card means operably associated with said card receiving throat and adapted to automatically block said throat effectively impeding the ingress or egress of a credit card relative thereto, and demountable means providing a synchronizing timing track for said electromagnetic transducer means.

2. Magnetic credit card reader/writer apparatus comprising:

oppositely disposed electromagnetic transducer means adapted to straddle a magnetic credit card, means providing relative movement between said credit card and said electromagnetic transducer means, transducer positioning and aligning means operably associated with said credit card and said transducer means for accurately locating said transducer means adjacent to said card enabling said transducer means to read from or write upon said card at maximum signal level, and means cooperatively associated with said positioning means and said means providing relative motion for preventing accidental or premature removal of said credit card from said apparatus until such time as the reading or writing operation has been completed.

3. The invention in accordance with claim 2 further including means cooperating with said transducer means for synchronizing the timing of the data being written or read relative to said credit card.

4. Credit card reading/writing apparatus comprising:

means demountably support a magnetic credit card such that electromagnetic information-data can be applied thereto and removed therefrom at will, means to move an information-data transducer adjacent to said credit card effective to apply information-data to or read information-data from said card along an information-date track carried by said card, means operably coupled to said demountable support means for flattening said card while supporting the latter adjacent to said transducer, means providing a timing track for the information-data carried by said credit card, electromagnetic transducer means operable to scan said timing track and said inforamtion-data track and to synchronize the derived signal output therefrom for reading or writing said data, and means coupling said transducer to a unitary drive means for moving said transducer over the respective data and timing tracks on said credit card effective thereby to derive information-data therefrom or to apply information-data thereto in a synchronized uniform manner as desired.

5. The invention in accordance with claim 4 wherein said flattening means comprises an elongated, substantially flat member movable into and out of compression relationship relative to said credit card effective to permit said transducer to read from or write upon said card regardless of any surface irregularities or undulations in said card.

6. Magnetic credit card read/write apparatus comprising:

mounting means supporting a magnetic card receiving throat into which an information-data bearing credit card can be inserted and removed at will, means for locking said credit card within said throat against accidental dislodgement and removal therefrom, means operably associated with said locking means signaling the condition of said apparatus relative to said card effective to condition the apparatus for operation, an information-data transducer movable across one face of said credit card for interrogating or applying data to said credit card in an area of said credit card bearing electromagnetically responsive material, a synchronizing/timing transducer movable across an opposite face of said credit card for synchronizing the information-data relative to said credit card enabling the electronic disposition of said information in an orderly fashion across the information-data area of said credit card, and means for adjustably positioning said information-data transducer and said synchronizing/timing transducer with respect to said credit card in each of the orthogonal planes of movement of said transducers relative to the plane of movement of said credit card so as to present the active portion of said transducers to the data bearing portions of said credit card effective to produce the greatest signal output from the information-data synchronizing-/timing tracks of said credit card.

7. The invention in accordance with claim 6 wherein said blocking means comprises a pair of tangs adapted to be automatically moved into and out of blocking or interfering relationship to said credit card when said card is inserted into said apparatus.

8. The invention in accordance with claim 6 wherein said signaling means comprises a cam actuated switch means.

9. The invention in accordance with claim 6 further including demountable replaceable storage means adapted to be positionable adjacent to said credit card and said timing transducer for producing signal information-data for the operation of said information-data transducer.

10. The invention in accordance with claim 6 further including gimbal mounting means for said transducer permitting at least two degrees of freedom of said transducer relative to said support and said credit card accommodating said transducer to any surface imperfections in said card.

11. The invention in accordance with claim 6 further including photo-optical means for indicating to said apparatus that said credit card is in a fully inserted and locked condition so that said transducer may be traversed across the face of said card to produce the signal output data.

12. The invention in accordance with claim 6 further comprising positioning and indicating signal means carried by said information-data and said synchronizing-timing transducer, operably disposed adjacent to photo-optical switch means effective upon movement of said signal means relative to said switch means to interrupt said photo-optical switch means indicating the precise location of said transducers.

* * * * *